United States Patent [19]

Mickael et al.

[11] Patent Number: 5,659,169
[45] Date of Patent: Aug. 19, 1997

[54] FORMATION DENSITY SENSOR HAVING DETECTOR ARRAY AND METHOD OF CALCULATING BULK DENSITY AND CORRECTION

[75] Inventors: Medhat W. Mickael, Sugar Land; Gary L. Mathis, St. Augustine, both of Tex.

[73] Assignee: Western Atlas International, Inc., Houston, Tex.

[21] Appl. No.: 698,438

[22] Filed: Aug. 19, 1996

[51] Int. Cl.$^6$ .................................................. G01V 5/12
[52] U.S. Cl. .............................. 250/269.3; 250/265
[58] Field of Search ............................. 250/264, 265, 250/269.3

[56] References Cited

U.S. PATENT DOCUMENTS

| | | | |
|---|---|---|---|
| 5,390,115 | 2/1995 | Case et al. | 250/269.3 X |
| 5,530,243 | 6/1996 | Mathis | 250/269.3 |

*Primary Examiner*—Edward J. Glick
*Attorney, Agent, or Firm*—Richard A. Fagin

[57] ABSTRACT

A method of measuring the density of an earth formation penetrated by a wellbore. The method includes irradiating the earth formation with gamma rays from a source, detecting Compton scattered gamma rays at a plurality of locations spaced apart from the source along the wellbore, calculating an apparent density of the formation from the detected gamma counting rate at each of the locations, calculating differences in apparent density between pairs of the apparent densities, calculating a correction for the apparent density from a distal one of the locations by scaling the differences in apparent density according to an empirical relationship, and calculating the density by combining the correction with the apparent density from the distal one of the locations. In a preferred embodiment, the empirical relationship is determined by measuring the apparent densities and differences in apparent density at a plurality of known values of density of the formation and a plurality of values of density and thickness of a medium interposed between the formation, and the source and the spaced apart locations. Scaling coefficients are determined by minimizing the value of an error function representing the difference between the known value of the density and the density determined according to the empirical relationship.

10 Claims, 7 Drawing Sheets

FORMATION DENSITY SENSOR HAVING DETECTOR ARRAY AND METHOD OF CALCULATING BULK DENSITY AND CORRECTION

BACKGROUND OF THE INVENTION

1. Field of the Invention

This invention is related to the field of wellbore logging instruments. More specifically, the present invention is related to logging instruments which measure the bulk density of earth formations. The instrument of the invention includes a plurality of sensors used for compensating the bulk density measurements for the presence of "mudcake" on the wall of a wellbore wherein the mudcake has indeterminate bulk density and thickness.

2. Description of the Related Art

Well logging instruments are used to evaluate earth formations penetrated by wellbores for the presence of useful materials such as petroleum. Well logging instruments are typically lowered into the wellbore at one end of an armored electrical cable which conducts power to the instruments and returns measurement signals to the earth's surface for recording and observation. The instruments include sensors which measure various properties of the earth formations.

Measurements of the bulk density of the earth formations are particularly useful. Bulk density measurements are used for, among other things, determining the fractional volume of pore space in the earth formations in which fluids such as oil and gas may be present; determining the mineral composition of the earth formation and for determining the weight, or overburden force, of the earth formation at any particular depth in the wellbore.

Well logging instruments known in the art for determining bulk density of the earth formation are typically derived from an instrument disclosed in U.S. Pat. No. 3,321,625 issued to Wahl. The instrument in the Wahl '625 patent includes a source of gamma rays having a predetermined energy magnitude. The source is typically a steady-state, radioisotopic chemical source such as cesium-137. The tool in the Wahl '625 patent includes two gamma-ray photon detectors positioned at spaced apart locations from the source. The source and detectors are typically disposed in a high-density (typically metallic tungsten) "pad" or "skid" mounted to one side of the tool, which restricts the gamma ray output of the source to be principally in the direction of the earth formation, and controls the entry of gamma rays into the detectors to be primarily from the direction of the earth formation. The skid is typically placed into firm contact with the wall of the wellbore by means of a powered, extensible arm directed from the opposite side of the tool on which the skid is located.

Gamma rays from the source can interact with electrons orbiting atoms in the materials forming the earth formation. Each interaction can cause a gamma ray to lose some of its energy and be deflected from its original direction of travel. The source is typically selected so that the original energy magnitude of the gamma rays facilitates this type of interaction, known as Compton scattering. The rate at which gamma rays lose energy and are deflected from their original directions is related to both the electron density of the earth formation (the number of electrons per unit volume of the formation) and the distance between the source and the detector. Some gamma rays can survive the Compton scattering process and return to the detectors. The counting rate at any one of the detectors resulting from Compton-scattered gamma rays can be described by the relationship:

$$I = I_o e^{-\mu x} \quad (1)$$

where $I$ represents the counting rate at a detector having a spacing $x$ from the source, $I_o$ represents the count rate of a detector at zero spacing from the source, and $\mu$ represents an "absorption" coefficient which is related to the electron density of the earth formation in contact with the skid and axially interposed between the source and particular detector. For most materials from which earth formations are typically composed, electron density is directly related to bulk density, so the measurements of detector count rates can be directly scaled into measurements of bulk density of the formation by using the relationship in equation (1).

As is disclosed in the Wahl '625 patent, the skid typically does not perfectly contact the wall of the wellbore. Wellbores are typically drilled with a fluid suspension, called "drilling mud" in which solid components of the suspension "plate out" to form an impermeable barrier across permeable earth formations which have lower fluid pressure than the hydrostatic pressure of the fluid column of drilling mud in the wellbore. The impermeable barrier, called "mud filtrate" or "mud cake", can in some instances exceed one inch in thickness. The mud filtrate would therefore typically be interposed between the skid and the wall of the wellbore. The instrument in the Wahl '625 patent provides a form of compensation for the interposition of mud filtrate between the wellbore wall and the skid by using two detectors at different axially spaced apart locations from the source. The detector positioned at the greater axial distance from the source (the "far-spacing" detector) will be responsive to gamma rays which have interacted with electrons at a greater radial distance from the wall of the wellbore than those reaching the other detector (the "near-spacing" detector). As is disclosed in the Wahl '625 patent, an empirical relationship is devised which relates the count rates at both detectors to a bulk density of the earth formation and a "correction" for various thicknesses and densities of mud cake. The empirical relationship is typically devised by inserting the tool into media of known bulk densities and including simulated "mud cake", typically rubber or plastic sleeves, of known densities and thicknesses in between the skid and the particular density medium. The count rates at the two detectors are recorded for each of the known conditions. Non-zero values of "correction" are indicated when count rates at both detectors deviate from count rates indicative of perfect contact with the wall of the wellbore, which in devising the empirical relationship are found by inserting the tool in the media with no "artificial mud cake" interposed between the skid and any of the media.

A drawback to the bulk density instruments known in the art derived from the Wahl '625 patent is that they generally require that the wall of the wellbore be reasonably smooth, and that the mud filtrate typically not exceed about one inch in thickness.

Several improvements to the apparatus disclosed in the Wahl '625 patent have been devised which seek to overcome the limitations of wellbore smoothness and maximum mudcake thickness suffered by the apparatus disclosed therein. For example U.S. Pat. No. 5,390,115 issued to Case et al. discloses a density instrument having three detectors at axially spaced apart locations from the source. Case et al. claim to be able to correct for mudcakes having thicknesses in excess of one inch. While Case et al. state that the measurements made by their apparatus are substantially independent of the density of the formation and the density of the mudcake, the error bounds and the conditions under which the apparatus disclosed will function correctly are not recited by Case et al.

U.S. Pat. No. 5,530,243 issued to Mathis discloses a density instrument having an array of sensors at axially spaced apart locations from the source to compensate for tool tilt and roughness of the wall of the wellbore. The apparatus disclosed in Mathis '243 does provide improved performance over the apparatus disclosed in Wahl '625, but the apparatus in Mathis '243 requires the use of a neural network to determine thickness of the mudcake and correction to the density readings therefrom. Training neural networks can be difficult and expensive.

The invention is intended to provide the improved performance of a density instrument having an array of detectors without the need to train a neural network.

SUMMARY OF THE INVENTION

The invention is a method of measuring the density of an earth formation penetrated by a wellbore. The method includes irradiating the earth formation with gamma rays from a source. The method also includes detecting Compton scattered gamma rays at a plurality of locations axially spaced apart from the source along the wellbore. An apparent density of the formation is calculated from the detected gamma ray counting rate at each of the locations. Differences in apparent density between pairs of the apparent densities are calculated. A correction for the apparent density from a distal one of the locations is calculated by scaling the differences in apparent density according to an empirical relationship, and the density is calculated by combining the correction with the apparent density from the distal one of the locations.

In a preferred embodiment of the invention, the empirical relationship is determined by measuring the apparent densities and the differences in apparent density at a plurality of known values of density of the formation and a plurality of values of density and thickness of a medium interposed between the formation, and the source and the spaced apart locations. Scaling coefficients for the empirical relationship are determined by minimizing the value of an error function representing the difference between the known value of the density and the density determined according to the empirical relationship.

DESCRIPTION OF THE PREFERRED EMBODIMENT

Figure 1:
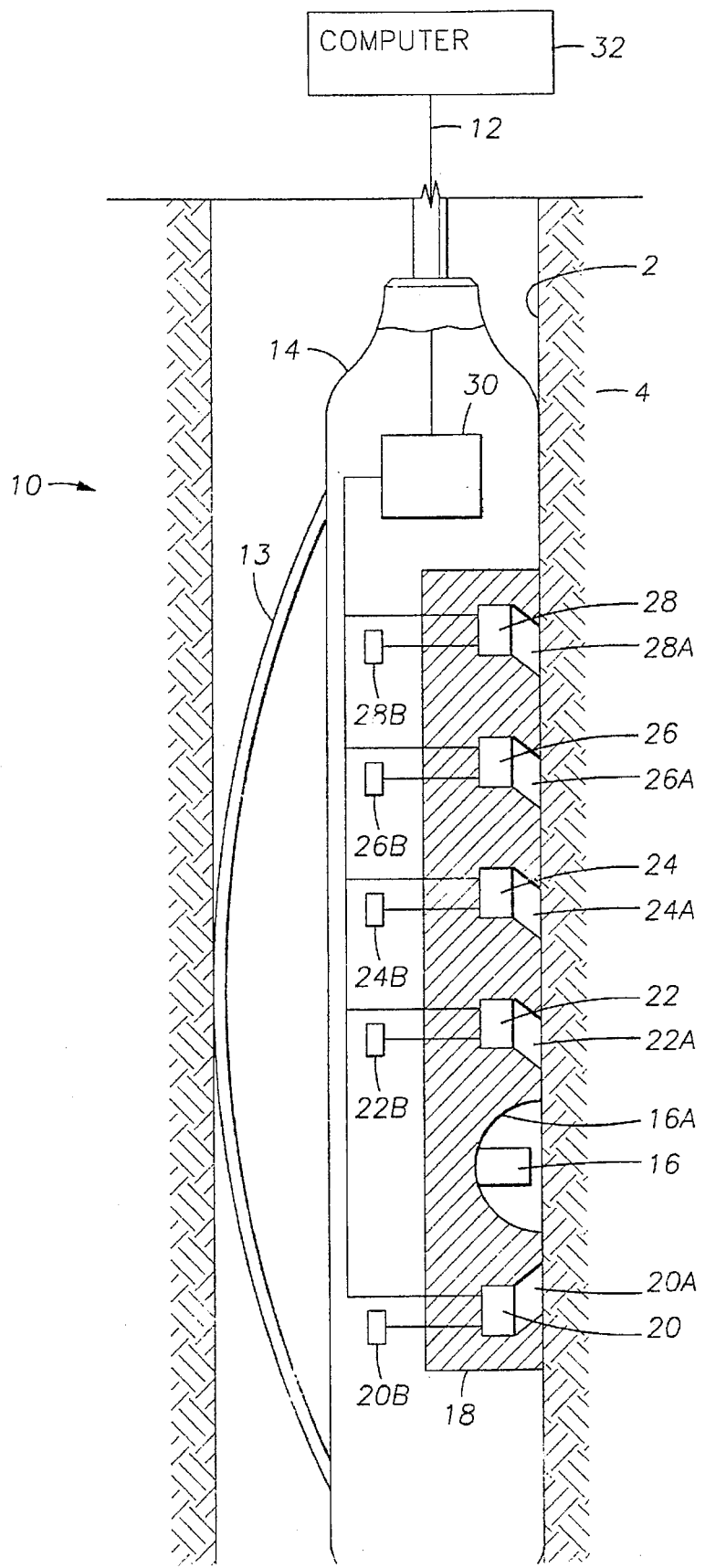
FIG. 1 shows a density well logging tool according to the invention.

The invention can be better understood by referring to FIG. 1. A density well logging apparatus 10 includes an elongated tool housing, or sonde 14, adapted to move through a wellbore 2 drilled through earth formations 4. The sonde 14 can be attached to one end of an armored electrical cable 12. The cable 12 can be used to lower the sonde 14 into and withdraw it from the wellbore 2, to conduct electrical power to the tool 10, and to carry signals transmitted by the tool 10 to the earth's surface for observation and recording, as is known in the art.

An axially elongated shield 18, typically composed of a very dense material such as tungsten, is disposed in the sonde 14. The shield 18 is preferably radially displaced to one side of the sonde 14 to enable contact with the wall of the wellbore 2. The shield 18 typically includes a number of openings or "windows", such as those shown at 20A, 22A, 24A, 26A and 28A, through which gamma rays can pass relatively unimpeded. As is known in the art, the windows can be formed so as to open towards likely directions of origin of gamma rays coherently scattered by the earth formation 4. The windows optionally can be filled or covered to the level of the exterior surface of the shield 18 with a low density material, of types known in the art, which can exclude fluids in the wellbore 2 but enable relatively unimpeded passage of the gamma rays.

The side of the shield 18 on which the open ends of the windows are located typically is positioned in the wellbore 2 proximally to the wellbore 2 wall. As is understood by those skilled in the art, gravity tends to move the shield 18 into contact with the wall of the wellbore 2 because the shield 18 is radially offset inside the sonde 14. The sonde 14 can optionally be provided with a bowspring 13 or other eccentralizing device disposed on the sonde 14 radially opposite to the shield 18. The bowspring 13 presses the shield 18 into contact with the wall of the wellbore 2 when gravity does not provide sufficient force, such as in a substantially vertical wellbore.

Disposed inside the shield 18 at the inner end of each window is a gamma ray detector, shown as a 1st detector 22, a 2nd detector 24, a 3rd detector 26, and a 4th detector 28. Another gamma ray detector 20, referred to as the 0th detector, can be located in the shield 18 axially opposite the 1st detector 22 from a gamma ray energy source 16. The purpose for the 0th detector 20 will be further explained, but it is to be expressly understood that this particular embodiment of the invention does not require the 0th detector 20.

The detectors can be geiger-mueller type counters or, preferably, scintillation counters. Each detector can include a corresponding high voltage power supply such as 20B, 22B, 24B, 26B, and 28B, of a type known in the art. The signal output of each detector can be electrically connected to a telemetry unit 30, which can apply signals to the cable 12 corresponding to the numbers of counts registered by each detector in response to detected gamma rays.

As is understood by those skilled in the art, circuitry (not shown) associated with transmission of counts from scintillation counter gamma ray detectors can include a multichannel pulse-height analyzer (not shown) for characterizing the apparent energy level of each gamma ray detected by each one of the detectors. As is also understood by those skilled in the art, the telemetry unit 30 can send signals to the earth's surface corresponding to the apparent energy of each of the gamma rays counted by each detector for analysis of such properties as photoelectric effect. The selection of scintillation counters for the detectors and/or using pulse-height analyzers in the circuitry is a matter of convenience for the system designer and is not to be construed as a limitation on the invention.

The source of high energy gamma rays 16 can be disposed within the shield 18 in yet another window, shown at 16A. The source 16 preferably is a radioisotope-type such as cesium-137 which emits gamma rays having a substantially uniform energy level of about 667 thousand electron volts (keV). The energy of the gamma rays emitted from the cesium-137 source, as is understood by those skilled in the art, is well suited to produce coherent, or "Compton", scattering of the gamma rays by interaction with electrons orbiting atoms in the formation 4.

Window 16A is formed to allow gamma rays from the source 16 to enter the earth formation 4 proximal to the open end of the window 16A, but substantially excludes passage of gamma rays in any other direction, particularly directly along the shield 18 towards the detectors. The shield 18 therefore substantially excludes entry of gamma rays into the detectors from any other direction but from the window in the shield 18 associated with each detector.

Gamma rays leave the source 16 and enter the formation 4. Some of the gamma rays can be Compton scattered by electrons orbiting atoms of the earth formation 4, and return to one of the detectors. If there is substantially perfect contact between the shield 18 and the earth formation 4, and if the earth formation 4 is substantially homogeneous, the counting rate which would be observed at any particular one of the detectors would generally be related to the electron density of the earth formation 4 in contact with the shield 18, and to the distance between the source 16 and the particular detector. The relationship in this case of count rates at any one of the detectors can be expressed by the equation:

$$I = I_o e^{-\mu x} \qquad (2)$$

where I represents the count rate at the detector having a spacing x from the source 16, $I_o$ represents the count rate at a detector having zero spacing from the source 16, and $\mu$ represents an "absorption" coefficient related to the electron density of the formation 4 in contact with the shield 18. For most materials from which the earth formation 4 is typically composed, the electron density is directly related to the bulk density, so the measurements of detector count rate can be directly converted to measurements of apparent bulk density of the earth formation 4. Calculation of the apparent bulk density from the gamma ray counting rates at each detector can be performed according to equation (2) by a computer 32 which is electrically connected to the telemetry unit 30. Preferably the computer 32 is located at the earth's surface, but the computer 32 could alternatively be located in another portion of the tool 10. Therefore, calculation of the density and correction according to the invention is not to be limited to being performed at the earth's surface. The precise manner in which the computer 32 determines the bulk density of the earth formation 4 will be further explained.

As is understood by those skilled in the art, gamma rays which are Compton scattered through the earth formation 4 and reach a detector having a longer spacing from the source 16, such as the 4th detector 28, typically travel through a greater thickness (or radial "depth") of the formation 4 away from the wall of the wellbore 2 than gamma rays which reach a more closely spaced detector, for example, the 2nd detector 24. The radial thickness of the earth formation 4 to which a particular detector is responsive is therefore related to the axial spacing between the source 16 and the particular detector.

The wellbore 2 is typically filled with a fluid suspension known as "drilling mud" when it is drilled. The material composition of the typical drilling mud is intended to form a substantially impermeable barrier, called "mud cake" on the wall of the wellbore when the earth formation is permeable. The mud cake stops loss of the liquid phase of the drilling mud into the pore spaces of the permeable earth formation. When the instrument 10 is moved through the wellbore 2, however, the mudcake causes the shield 18 to be spaced from the wall of the wellbore 2. The density of the mud cake affects the apparent density readings of each detector. As can be inferred from the previous discussion about the radial depth of investigation of the various detectors, the more closely spaced the detector, the greater is the magnitude of the effect of the mud cake on the apparent density reading made by that detector. The calculations performed in the computer 32 are intended to provide a reading for the density of the earth formations which is adjusted or "corrected" for the effect of the mud cake.

In the invention, the count rates from each detector during logging of the wellbore 2 can be scaled into an apparent density reading for each detector according to equation (2). The apparent density reading from one of the detectors, typically the one having the longest axial spacing from the source 16 (which in this embodiment would be the 4th detector 28) is then adjusted by using the apparent density readings from the other detectors. It has been determined that a correction value can be calculated for the apparent density reading of the longest spaced detector according to a second order polynomial expression in the form:

$$\rho = \rho_n + \sum_{j=1}^{n} \sum_{j=i+1}^{n} A_{ij}(\Delta\rho)_{ij} + \sum_{i=1}^{n} \sum_{j=i+1}^{n} B_{ij}(\Delta\rho)_{ij}^2 \qquad (3)$$

where the apparent density reading from the detector having the greatest axial spacing from the source 16 is represented by $\rho_n$, n represents the total number of detectors. In this embodiment n can be equal to four. The 0th detector 20 is not used in this particular calculation and its presence does not change the value of n. The use of the 0th detector 20 will be further explained. $\rho_i$ represents the apparent density reading at the i-th detector, and $\Delta\rho_{ij}$ represents the difference in apparent density readings between the i-th and the j-th detectors. As can be determined from equation (3), j=i+1 indicating that these detectors are adjacent to each other. In this embodiment of the invention, the detector for which the density correction is calculated can be the 4th detector 28, since n can be four.

The selection of a second order polynomial to relate the density correction to the differences between the apparent density readings of adjacent detectors represents a compromise between the requirements of speed of computation and the required precision of the correction value. Higher order polynomial expressions may provide greater precision but may only be calculated relatively slowly.

It is to be understood that the invention is not limited to calculation of a corrected density based on the apparent density reading at the 4th detector 28, nor is n, the number of detectors in the tool 10, limited to four. In certain circumstances, which will be further explained, it may be preferable to use the apparent density reading from a more closely spaced detector, for example the 3rd detector 26, and calculate corrections according to equation (3) (and in this case n would be set to three) using apparent density readings from the 1st 22 and the 2nd 24 detectors. It is also possible to build the tool 10 using more than four detectors axially spaced apart on one side of the source 16. In selecting the number of detectors to use, the system designer should consider that as the number of detectors is increased, the accuracy of the solution to equation (3) would increase, and therefore the true density of the formation could be determined more accurately. This benefit would, however, be offset by a corresponding decrease in the axial resolution of the tool 10, as the axial resolution is approximately limited to the spacing between the source 16 and the detector from which the measurements are used to calculate the corrected density. Furthermore, as the axial spacing of this detector from the source increases, the counting rate, for any formation density value, decreases according to equation (2). Therefore, the statistical precision of an instrument having a larger number of detectors would decrease correspondingly.

Figure 2:
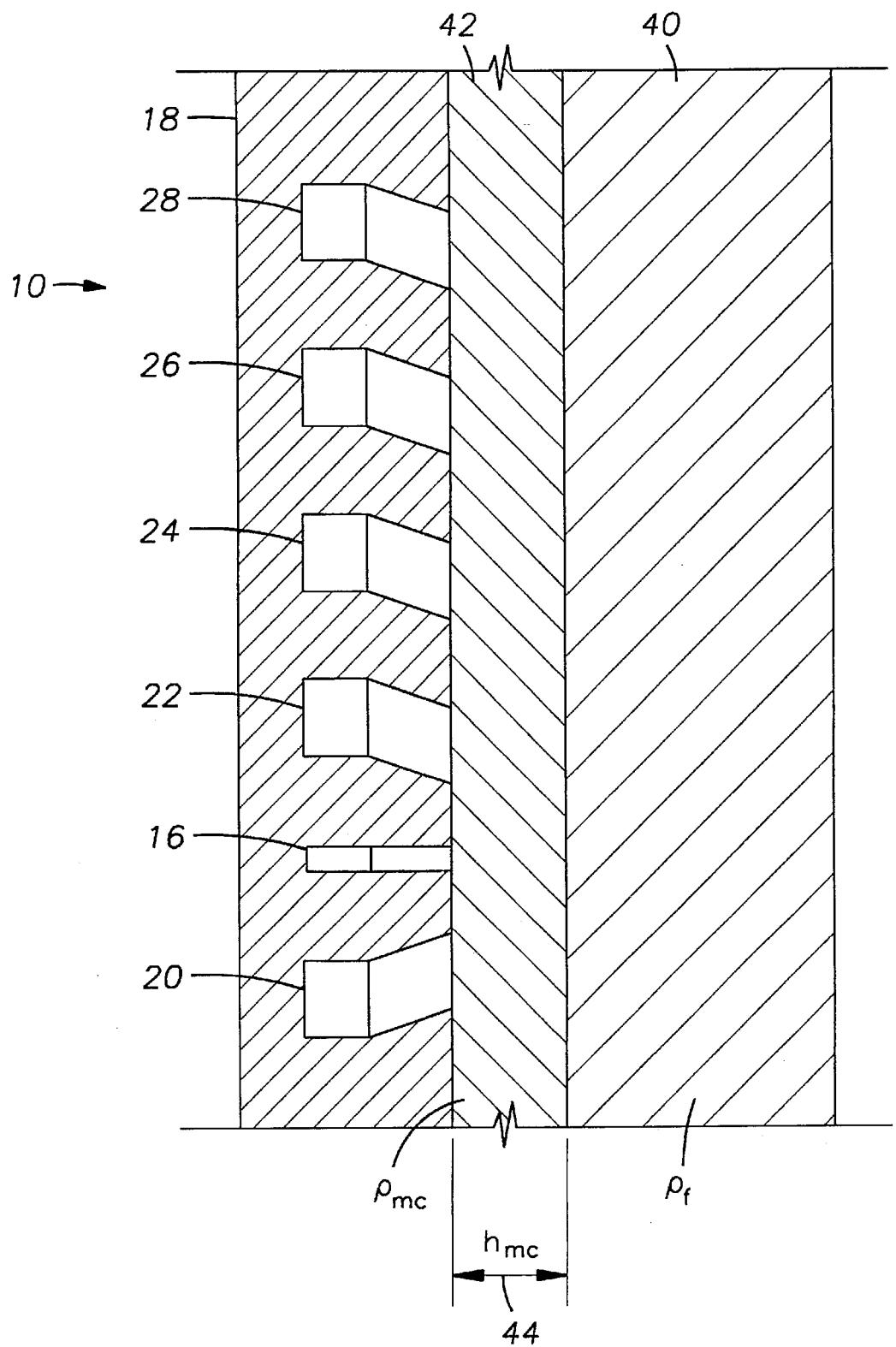
FIG. 2 shows a configuration of simulation formations and mudcakes used to determine the response of the tool in FIG. 1.

A and B in equation (3) represent coefficients, or "weighting factors", which are unique to each configuration of the tool 10. The term "configuration" used herein refers to the spacings of the individual detectors from the source 16, the type and sensitivity of the individual detectors, and the gamma ray output strength of the source 16. A and B can be determined by simulation of the response of the tool 10 under various conditions of formation bulk density, mudcake thickness, mudcake density, and drilling mud thickness and density (referred to as "stand off" or separation distance between the shield 18 and the wall of the wellbore 2). The simulation can be performed using Monte Carlo modelling. The simulation can be better understood by referring to FIG. 2. A simulation formation, shown at 40, can be positioned proximal to the shield 18. The simulation formation 40 can have a density represented by $\rho_f$. Interposed between the simulation formation 40 and the shield 18 can be a simulation mudcake 42 having a thickness represented by $h_{mc}$ and a density represented by $\rho_{mc}$. For each set of simulated conditions, an apparent density reading, at each detector, calculated according to equation (3) can be compared with the actual formation density which is used in the simulation. A and B can then be calculated using the differences between density of the simulation formation 40 and the apparent density reading calculated by equation (3), so that an error function in the form of the following expression reaches a minimum value:

$$\chi^2 = \sum_{j=1}^{m} \frac{1}{1 + \exp(-[abs(\rho^j - \rho_t^j) + \sigma^j - \epsilon]/\alpha^2)} \quad (4)$$

In equation (4) $\rho^j$ represents the density calculated according to equation (3) for each simulation condition, $\rho_t^j$ represents the "true" density of the simulation formation 40 for each simulation condition, $\sigma^j$ represents the statistical error of the measurement for each simulation condition, $\epsilon$ represents a target value of measurement error, which in this simulation was set to 0.05 gm/cc, and $\alpha$ represents a target standard deviation, which in this simulation was set to 0.005 gm/cc. The simulation includes all the individual combinations of simulation formation 40 and simulation mudcake 42 parameters shown in TABLE 1.

TABLE 1

SIMULATION PARAMETERS

| Parameter | Density Range | Thickness Range | Increment |
|---|---|---|---|
| Formation | 1.8–2.71 gm/cc | N/A | 6 steps |
| Mud thickness (stand off) | | 0–1 inch | 0.5 inches 3 steps |
| Mud density | 1.0–2.2 gm/cc | | 0.2 gm/cc 6 steps |
| Mudcake thickness | | 0–1 inch | 0.5 inches 3 steps |
| Mudcake density | mud density value –2.2 gm/cc | | 0.2 gm/cc 6 steps |

The response of the detectors was simulated using the following tool configuration: the source 16 has an energy output and spectral equivalence to a 2 curie cesium-137 radioisotopic source; the spacing from the source 16 to the 1st detector 22 is 6.75 inches; the 2nd detector 24 is spaced 9.75 inches from the source 16; the 3rd detector 26 is spaced 12.75 inches from the source 16; and the 4th detector 28 is spaced 17 inches from the source 16. The source 16 strength and detector spacing values described herein for the simulation are only meant to explain the configuration used to test the response of the invention. Accordingly, these values are not meant to limit the invention as other values could be selected which would provide the instrument of the invention with similar response to that described herein.

Figure 3:
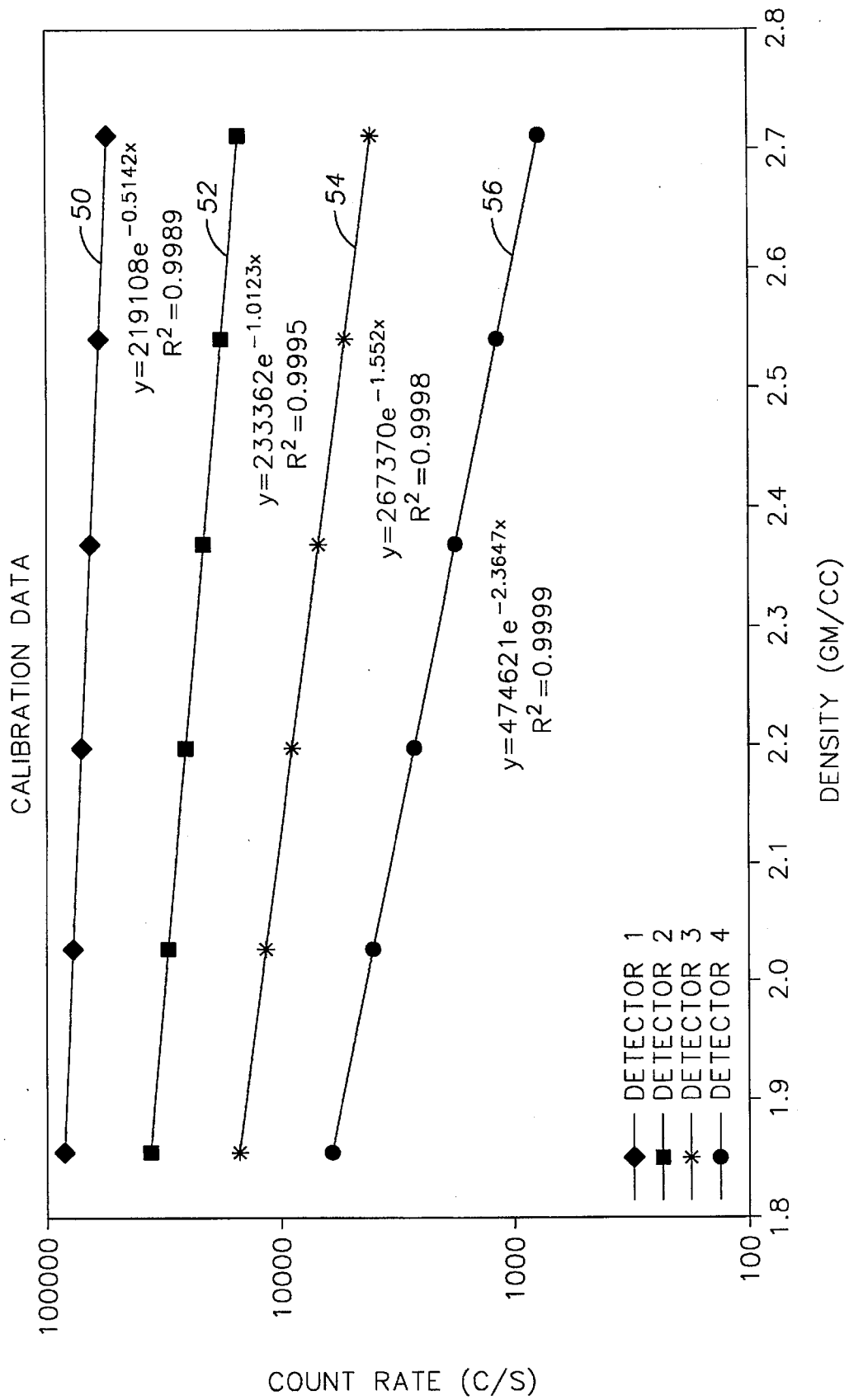
FIG. 3 shows the count rates of the detectors of the tool in FIG. 1 with respect to formation density when there is no mudcake interposed between the tool shield and the formation.
Figure 4:
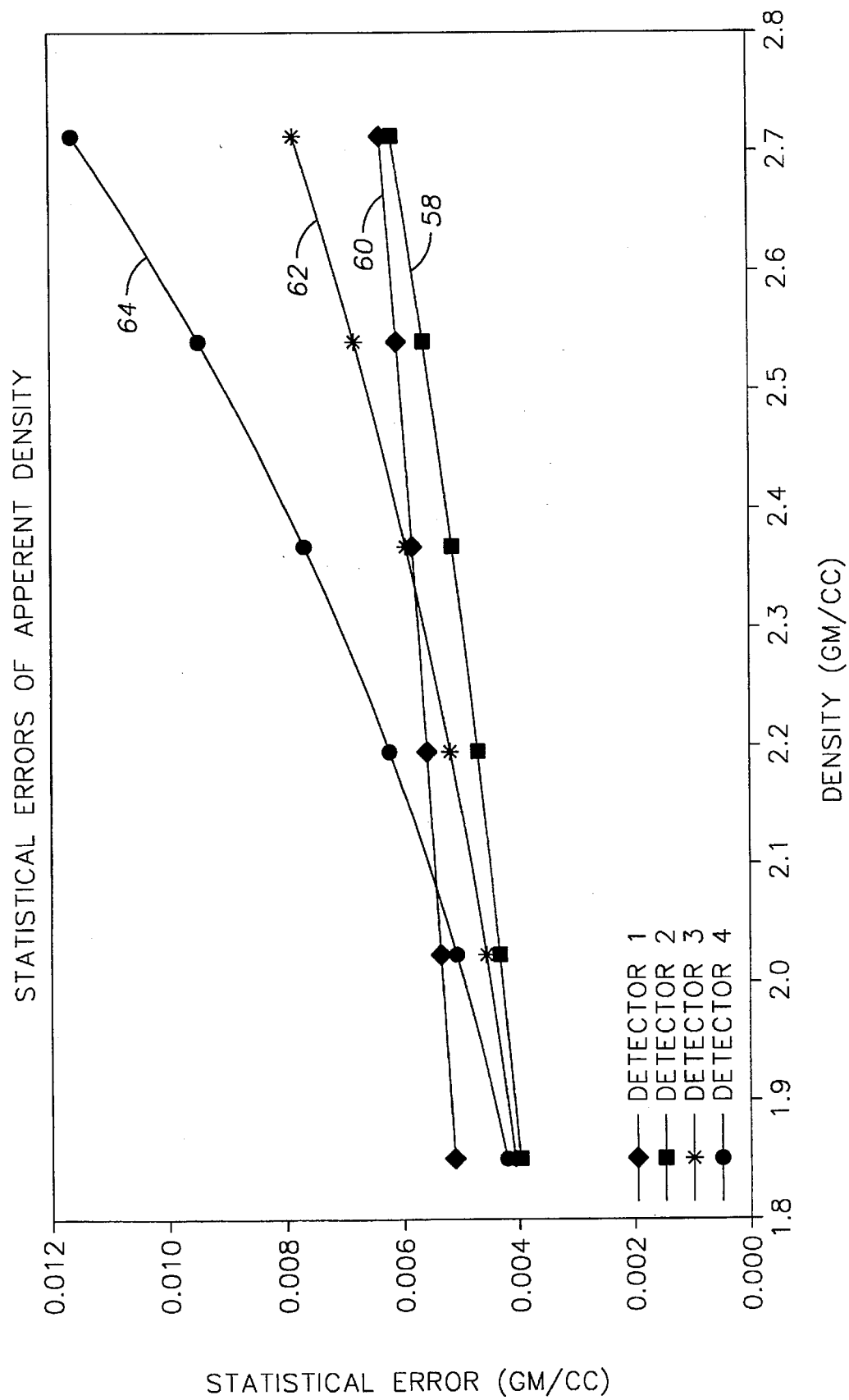
FIG. 4 shows the statistical precision of the detectors of FIG. 1 with respect to density when there is no mudcake.

Results of the simulation of the response of the invention can be observed in FIGS. 3–7. FIG. 3 shows a graph of apparent counting rates of each of the detectors with respect to formation density when there is no mudcake interposed between the shield 18 and the simulation formation 40. The response of the 4th detector 28 is shown at curve 56. Curves 50, 52, and 54, respectively, show the response of the 1st, 2nd and 3rd detectors. Curves 50, 52, 54, and 56 indicate that the response of the detectors in the absence of mudcake substantially follows the relationship of equation (2). FIG. 4 shows a graph of the expected statistical error of density measurements made by each of the detectors with respect to formation density. In the graph of FIG. 4 it is again the case that no mudcake is interposed between the shield 18 and the simulation formation 40. The statistical error response for the first detector is shown at curve 58. Curves 60, 62, and 64, respectively show the expected statistical error in measurements made by the 2nd, 3rd and 4th detectors. For each detector the statistical error at densities less than 2.71 gm/cc (which is the density of limestone earth formation having substantially no porosity) is less than about 0.012 gm/cc. The statistical errors shown in the graph of FIG. 4 indicate that the spacings selected for the invention will generally provide response which is statistically accurate enough to meet industry standards.

Figure 5:
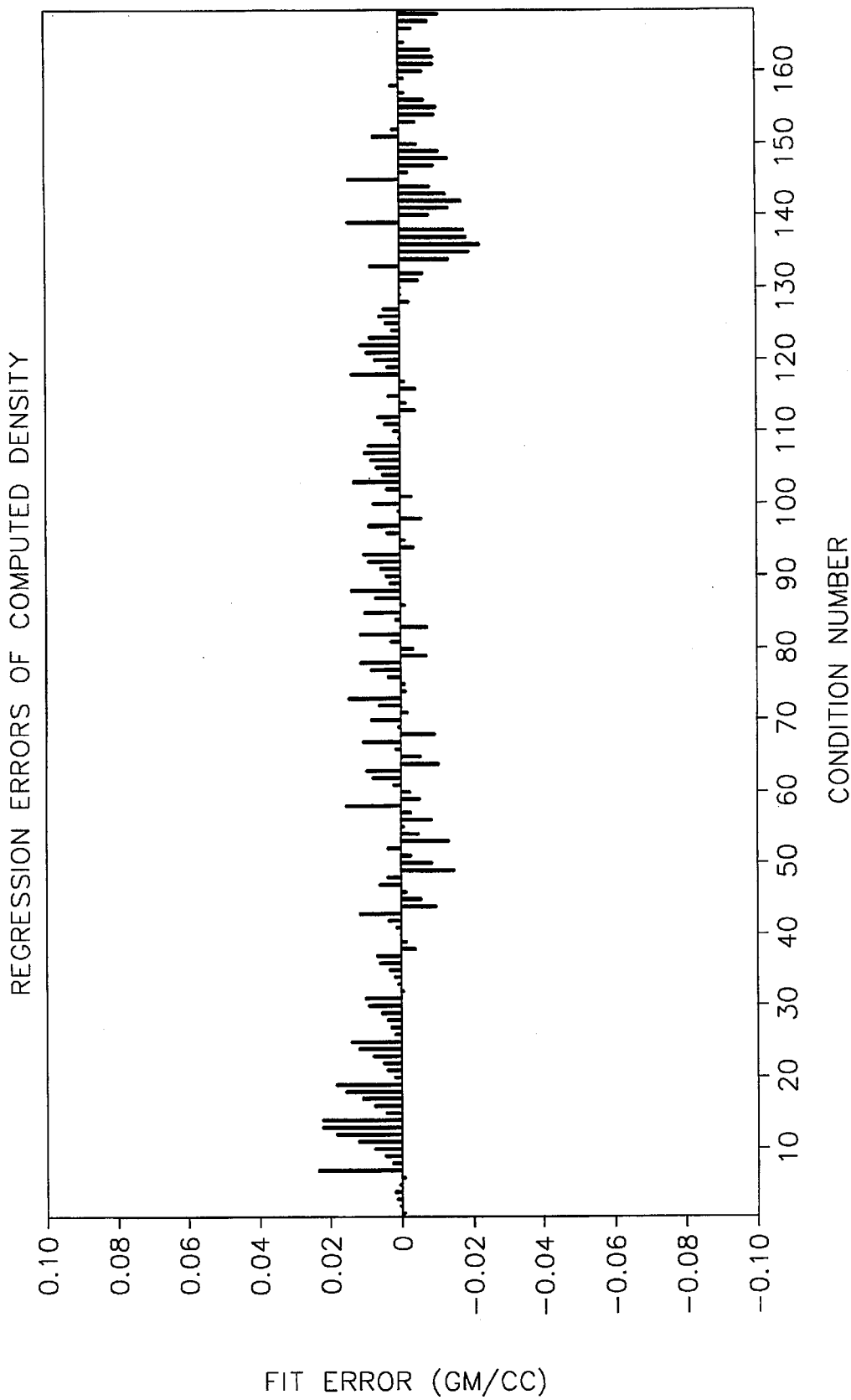
FIG. 5 show a graph of the expected regression error for various simulated conditions of formation density, mudcake density and mudcake thickness.
Figure 6:
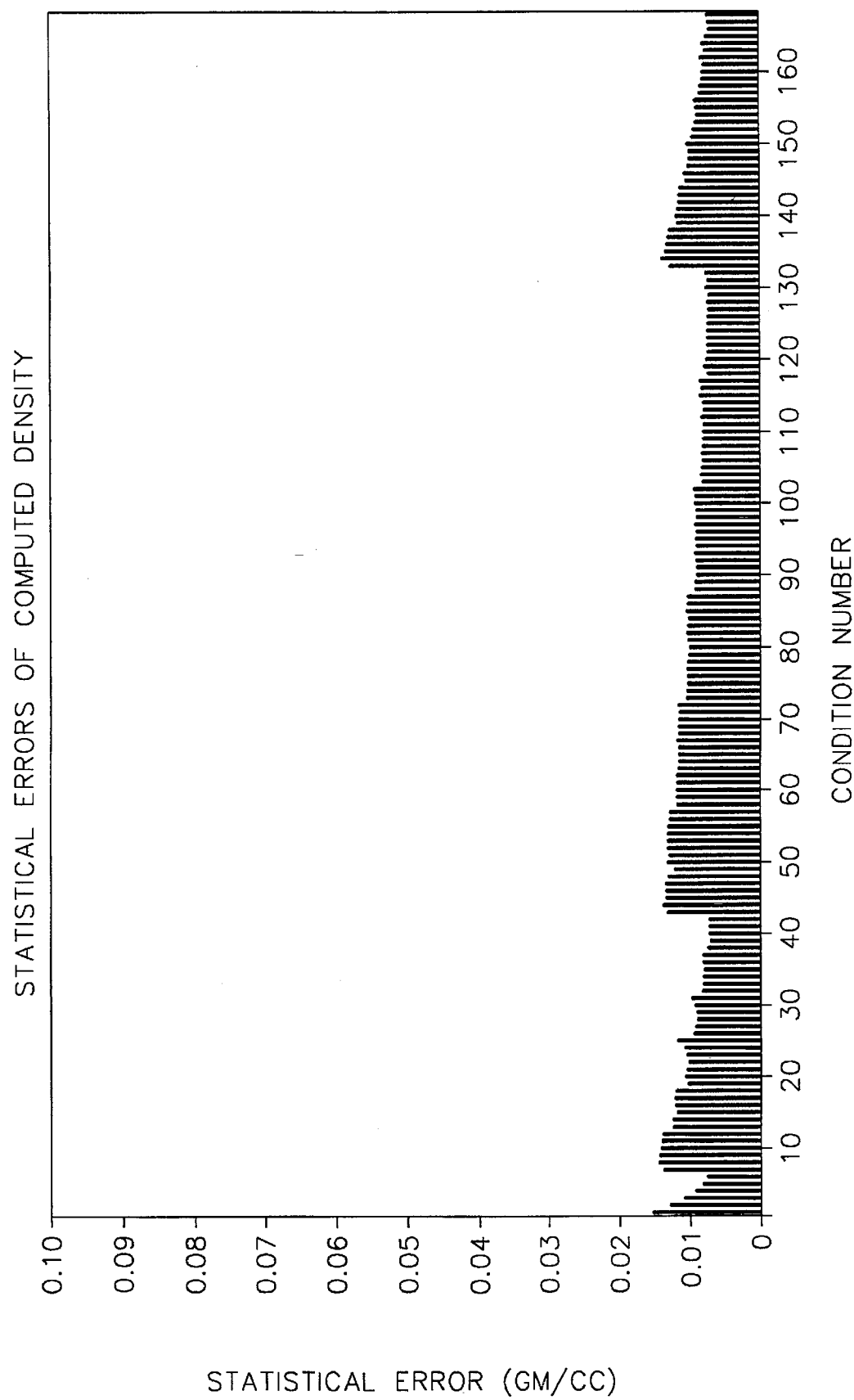
FIG. 6 shows a graph of the expected statistical error for the simulation cases shown in FIG. 5.
Figure 7:
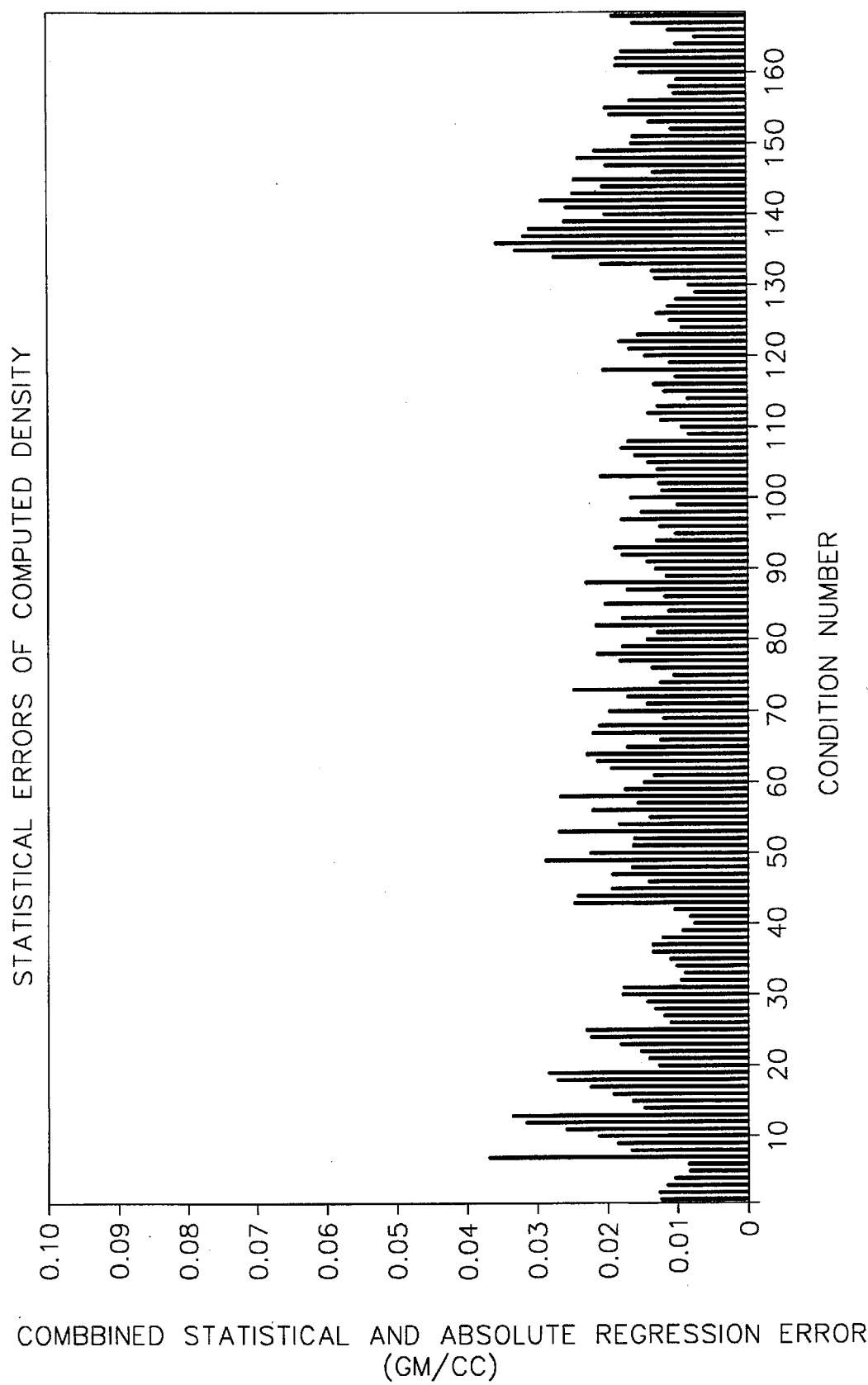
FIG. 7 shows a graph of the total error for the simulation cases shown in FIG. 5.

FIG. 5 shows the a graph of individually calculated regression error results for the simulation conditions defined by the simulation values listed in TABLE 1. The regression error was calculated according to equation (4). As can be observed in FIG. 5, substantially all of the regression errors are less than about 0.02 gm/cc. FIG. 6 shows a graph, for the same individual sets of conditions, the statistical error calculated for the formation density calculated according to equation (3). The total density error is shown for the same individual sets of conditions by the graph in FIG. 7.

DESCRIPTION OF ALTERNATIVE EMBODIMENTS

Referring once again to FIG. 1, the purpose of the 0th detector 20 will now be explained. In this embodiment of the invention, the 0th detector 20 and the 1st detector 22 can have substantially the same axial spacing from the source 16. If the tool 10 is in axial alignment with the wall of the wellbore 2, the amount of mudcake between the shield 18 and the formation 4 should be substantially the same at the 0th detector 20 and the 1st detector 22 if the wellbore wall is smooth. The apparent density reading made by the 0th detector 20 and the 1st detector 22 should be substantially the same under these conditions. If the wellbore wall is not smooth, or if the tool 10 is not in axial alignment with the wall of the wellbore 2, then the apparent density readings at the 0th detector 20 and the 1st detector 22 will be different. Differences between the apparent density readings at the 0th detector 20 and the 1st detector 22 can be used to determine axial misalignment of the tool 10, called "tool tilt". One method of determining misalignment using apparent density readings from the 0th detector 20 and the 1st detector 22 is described in U.S. Pat. No. 5,530,243 issued to Mathis, incorporated herein by reference. All of the signals needed to perform the method described in the Mathis '243 patent are already recorded simultaneously by the tool 10 as described herein. The system designer only needs to include additional programming in the computer 32 to perform the tool tilt measurement in addition to preforming the density measurement described in the first embodiment of the invention. The Mathis '243 patent also describes a method of determining "washout" and apparent roughness of the wall of the wellbore 2. This embodiment of the invention can also include calculations of washout and roughness according to Mathis '243 while simultaneously calculating formation density according to equation (3).

Another embodiment of the invention makes use of the fact that frequently the mudcake (44 in FIG. 2) is thin enough so that apparent density readings from the 3rd detector 26 or the 2nd detector 24 are close enough to the true density of the formation, that it may be unnecessary to use the apparent density readings from the 4th detector 28. The A and B coefficients determined by simulation as previously described herein can also be determined for the tool 10 when the 3rd detector 26 is the one for which the correction is calculated; In this case, n can be set to three, and the apparent density readings used during simulation as previously described herein can be used to calculate A and B coefficients for which the error function of equation (4) reaches a minimum value. If the difference in apparent density readings between each of the detectors, represented by $\Delta\rho_{ij}$ in equation (3), falls below a threshold value, such as 0.005 gm/cc, then the programming in computer 32 can select the 3rd detector 26 as the n-th detector and calculate the density and correction values accordingly. If the apparent density differences between detectors fall below a smaller threshold, such as 0.003 gm/cc, then the computer 32 can select the 2nd detector 24 as the n-th detector and calculate the density and correction accordingly. One advantage gained by selecting the n-th detector as described in this embodiment of the invention is that the axial resolution and the statistical precision of the tool 10 can be improved relative to that available when using readings from the more distal detectors. This improvement is accomplished without changing the physical spacings of the detectors.

Those skilled in the art will readily devise other embodiments of the invention which do not depart from the spirit of this invention. Accordingly, the invention should be limited in scope only by the attached claims.

What is claimed is:

1. A method of determining density of an earth formation penetrated by a wellbore, comprising:

irradiating said earth formation with gamma rays from a source inserted into said wellbore;

detecting Compton scattered gamma rays at a plurality of locations spaced apart from said source along said wellbore;

calculating an apparent density of said formation from a counting rate of said detected gamma rays at each of said locations;

calculating differences in apparent density between pairs of said apparent densities;

calculating a correction for said apparent density calculated for a most distal one of said plurality of locations by scaling said differences in apparent density according to an empirical relationship; and calculating said density by combining said correction with said apparent density from said most distal one of said locations.

2. The method as defined in claim 1 wherein said empirical relationship is determined by measuring said apparent densities and said differences in apparent density for a plurality of known values of density of a first medium corresponding to said formation and for a plurality of values of density and thickness of a second medium interposed between said first medium and said source and said spaced apart locations.

3. The method as defined in claim 1 further comprising determining a measure of tool tilt by determining a difference in said apparent densities between ones of said locations disposed on axially opposite sides of said source and substantially equally axially spaced apart from said source.

4. The method as defined in claim 1 further comprising determining a measure of roughness of the wall of the wellbore by determining a difference in said apparent densities between ones of said locations disposed on axially opposite sides of said source and substantially equally axially spaced apart from said source.

5. A method of determining density of an earth formation penetrated by a wellbore from gamma rays scattered by Compton scattering and detected at a plurality of spaced apart locations from a source of said gamma rays, the method comprising:

calculating an apparent density of said formation from a counting rate of said detected gamma rays at each of said locations;

calculating differences in apparent density between pairs of said apparent densities;

calculating a correction for said apparent density calculated for a most distal one of said plurality of locations by scaling said differences in apparent density according to an empirical relationship; and calculating said density by combining said correction with said apparent density from said most distal one of said locations.

6. The method as defined in claim 5 wherein said empirical relationship is determined by measuring said apparent densities and said differences in apparent density for a plurality of known values of density of a first medium corresponding to said formation and for a plurality of values of density and thickness of a second medium interposed between said first medium and said source and said spaced apart locations.

7. The method as defined in claim 5 further comprising determining a measure of tool tilt by determining a difference in said apparent densities between ones of said locations disposed on axially opposite sides of said source and substantially equally axially spaced apart from said source.

8. The method as defined in claim 5 further comprising determining a measure of roughness of the wall of the wellbore by determining a difference in said apparent densities between ones of said locations disposed on axially opposite sides of said source and substantially equally axially spaced apart from said source.

9. A method of determining density of an earth formation penetrated by a wellbore from gamma rays scattered by Compton scattering and detected at a plurality of spaced apart locations from a source of said gamma rays, the method comprising:

calculating an apparent density of said formation from a counting rate of said detected gamma rays at each of said locations;

calculating differences in apparent density between pairs of said apparent densities;

selecting a closer spaced one of said locations other than a most distal one of said locations ween said differences in apparent density between said locations fall below a predetermined threshold;

calculating a correction for said apparent density for said selected one of said plurality of locations by scaling said differences in apparent density between each of said spaced apart locations located between said source and said selected one of said locations, according to an empirical relationship; and calculating said density by combining said correction with said apparent density from said selected one of said spaced apart locations.

10. A method of determining density of an earth formation penetrated by a wellbore, comprising:

irradiating said earth formation with gamma rays from a source inserted into said wellbore;

detecting Compton scattered gamma rays at a plurality of locations spaced apart from said source along said wellbore;

calculating an apparent density of said formation from a counting rate of said detected gamma rays at each of said locations;

calculating differences in apparent density between pairs of said apparent densities;

selecting a closer spaced one of said locations other than a most distal one of said locations when said differences in apparent density between said locations fall below a predetermined threshold;

calculating a correction for said apparent density for said selected one of said plurality of locations by scaling said differences in apparent density between each of said spaced apart locations located between said source and said selected one of said locations, according to an empirical relationship; and calculating said density by combining said correction with said apparent density from said selected one of said spaced apart locations.

* * * * *